United States Patent [19]

Hernandez-Mena et al.

[11] Patent Number: 5,611,939
[45] Date of Patent: Mar. 18, 1997

[54] METHODS FOR INHIBITING THE PRODUCTION OF SLIME IN AQUEOUS SYSTEMS

[75] Inventors: Roy Hernandez-Mena, The Woodlands, Tex.; Richard J. Sujdak, Yardley, Pa.; Patric L. Friend, Conroe, Tex.

[73] Assignee: BetzDearborn Inc., Trevose, Pa.

[21] Appl. No.: 657,122

[22] Filed: Jun. 3, 1996

Related U.S. Application Data

[63] Continuation-in-part of Ser. No. 568,070, Dec. 6, 1995.

[51] Int. Cl.$^6$ ..................................................... C02F 1/50
[52] U.S. Cl. ........................ 210/764; 210/928; 162/161; 510/249; 514/456
[58] Field of Search .................................. 210/764, 928; 162/161; 510/247, 249; 514/456

[56] References Cited

U.S. PATENT DOCUMENTS

| | | | |
|---|---|---|---|
| 2,046,614 | 7/1936 | Drewsen | 210/764 |
| 4,337,313 | 6/1982 | Hershberger et al. | 435/177 |
| 4,558,080 | 12/1985 | Quamme et al. | 524/72 |
| 4,579,927 | 4/1986 | Patel et al. | 527/400 |
| 4,613,672 | 9/1986 | Hara | 549/399 |
| 4,692,315 | 9/1987 | Greaves et al. | 422/18 |
| 4,692,316 | 9/1987 | Greaves et al. | 422/16 |
| 4,692,317 | 9/1987 | Greaves | 422/15 |
| 4,760,088 | 7/1988 | Laks | 514/456 |
| 4,906,656 | 3/1990 | Laks | 514/456 |
| 4,964,952 | 10/1990 | Bennison et al. | 162/158 |
| 4,999,197 | 3/1991 | Wursch | 424/195.1 |
| 5,110,585 | 5/1992 | Chaudhuri et al. | 424/70.27 |
| 5,158,711 | 10/1992 | Shirato et al. | 252/631 |
| 5,208,016 | 5/1993 | Ohmae et al. | 424/78.27 |
| 5,238,572 | 8/1993 | Hernandez-Mena et al. | 210/632 |
| 5,256,304 | 10/1993 | Meyer et al. | 210/708 |
| 5,382,371 | 1/1995 | Stahl et al. | 507/221 |
| 5,427,587 | 6/1995 | Arkens | 524/538 |
| 5,433,863 | 7/1995 | Braden | 210/708 |

FOREIGN PATENT DOCUMENTS

| | | |
|---|---|---|
| 354889 | 2/1990 | European Pat. Off. |
| K0161411 | 11/1989 | Japan |

OTHER PUBLICATIONS

"Oolong Tea Polyphenols Inhibit Experimental Dental Caries in SPF Rats Infected with Mutans Streptococci", Caries Res. 1993; 27:124–129.

"Sargassum Tannin, An Antibiotic Which Retards Fouling", Sieburth et al., Nature, vol. 208, Oct. 2, 1965, pp. 52–53.

"Toxicity of Tannic Compounds to Microorganisms", Field et al., Plant Polyphenols, R.W. Hemingway Ed. 1992, pp. 673–692.

"Antibacterial Substances in Japanese Green Tea Extract Against Streptococcus Mutans, A Cariogenic Bacterium", Sakanaka et al., Agric. Biol. Chem., 53(9) 2307–2311, 1989.

"The Bactericidal Activity of Tea and Coffee", Toda et al., Letters in Applied Microbiology 1989, 8, 123–125.

"Antimicrobial Properties of Tannins", Scalbert, Phytochemistry, vol. 30, No. 12, pp. 3875–3883, 1991.

"Antimicrobial Activity of Green Tea Flavor Compounds and Their Combination Effects", J. Agric. Food Chemic. 1992, 40, 245–248.

"The Antifouling Activity of Natural and Synthetic Phenolic Acid Sulphate Esters", Todd et al., Phytochemistry, vol. 34, No. 2, pp. 401–404, 1993.

Primary Examiner—Cynthia L. Nessler
Attorney, Agent, or Firm—Alexander D. Ricci; Philip H. Von Neida

[57] ABSTRACT

Methods for inhibiting the attachment of microbes to surfaces in aqueous systems are disclosed. Copolymers of a tannin and a cationic monomer are added to aqueous systems, such as papermaking and cooling water systems, to inhibit microbial attachment to surfaces which cause slime formation problems.

16 Claims, No Drawings

METHODS FOR INHIBITING THE PRODUCTION OF SLIME IN AQUEOUS SYSTEMS

This is a continuation-in-part of Ser. No. 08/568,070, filed Dec. 6, 1995.

FIELD OF THE INVENTION

The present invention relates to methods for inhibiting the formation of slime by microorganisms in industrial aqueous systems. This method is directed towards inhibiting the attachment of microorganisms to the surfaces of industrial aqueous systems.

BACKGROUND OF THE INVENTION

Microorganisms and the slimes they produce are responsible for the formation of deposits in papermaking and industrial cooling water systems. Bacterial slimes are composed of exopolysaccharides (EPS) which exist as capsules or slime layers outside of the cell walls. When these slimes form on surfaces in paper or cooling systems, they trap organic and inorganic components and debris present in the process waters. As the microorganisms grow within paper system deposits, portions of the deposit may detach from the surface and cause paper breaks and spots in produced paper, which reduces the paper quality and increases machine downtime. Microbial growth and slime formation in cooling systems results in reduced heat exchange caused by biofouling and plugging of heat exchanger tubes, excessive fouling of the cooling water, tower decks and fill, and is a potential cause of under-deposit corrosion.

The term "slime" is a broad one covering a wide range of viscous, mucous, or leathery materials and mixtures found in industrial waters. Slimes are polymeric in nature and can be broadly classified as chemical, biological, or composite slimes depending upon their cause or composition. For example, raw materials and equipment used in the paper industry are not sterile and water used in conjunction with such equipment is continuously being contaminated with a wide variety of microorganisms from such sources as wood pulp, chemicals, air, makeup water, and the like. The growth of certain specific forms of these biological contaminants causes or produces polymeric excretions or products that are or become slime.

Historically, slime formation has been treated by the addition to industrial waters (e.g., white water associated with the pulp and paper industry) of slimicides. The purpose of these slimicides is to destroy or arrest the growth of some of the many organisms present in the water to thereby prevent or retard the formation of slime. Chemicals used as slimicides have included chlorine, phenylmercuric acetate, pentachlorophenol, tributyl tin oxide, and isothiocyanates, all of which are relatively toxic to humans.

Microbially produced exopolysaccharides can build up, retard heat transfer and restrict water flow through cooling water systems. Controlling slime-forming bacteria by applying toxic chemicals is becoming increasingly unaccepted due to environmental problems. In addition, the efficacy of the toxicants is minimized by the slime itself, since the extracellular polysaccharide surrounding microorganisms impedes toxicant penetration.

Toxicants cannot adequately control large populations of attached bacteria and they are effective mainly against suspended microorganisms. Although surfactants and dispersants which penetrate and help loosen slime can enhance the activity of toxicants, they are nonspecific and may have deleterious effects on the industrial process or the environment.

Recently, methods directed at controlling microbial slimes include the use of enzymes. These approaches attempt to disrupt the attachment process so that slime formation is prevented, or by hydrolyzing the exopolysaccharide (EPS) produced by the microorganisms after attachment. Using an enzyme to control slime will require knowledge of the composition of the slime, so that an appropriate enzyme-substrate combination is employed.

SUMMARY OF THE INVENTION

The present invention relates to methods for inhibiting the formation of slime in industrial aqueous systems such as papermaking and cooling water systems. The slime formation is inhibited by preventing the attachment of microorganisms to the surfaces of the aqueous systems where the slime-producing bacteria are present. It has been found that the addition of tannin-containing polymers to these aqueous systems inhibit the attachment of microorganisms, particularly bacteria.

DESCRIPTION OF THE RELATED ART

"Oolong Tea Polyphenols Inhibit Experimental Dental Caries in SPF Rats Infected with Mutans Streptococci," T. Ooshima et al., Caries Res 27:124–129, 1993, discusses the inhibitory effects of Oolong tea extracts derived from *Camellia sinensis* on dental caries in specific pathogen-free rats. This study indicated that Oolong tea extracts contain polyphenols and inhibit insoluble glucan synthesis by inhibiting glucosyltransferases (GTases) and the sucrose-dependent cell adherence of *Streptococcus mutans*.

"Toxicity of Tannic Compounds to Microorganisms", Field et al., Plant Polyphenols, 1992, pp. 673–692 discusses the toxicity of tannins to microorganisms by their hydrogen bonding with proteins. Toda et al. in "The Bactericidal Activity of Tea and Coffee", Letters in Applied Microbiology, 1989, 8, 123–125 demonstrates that extracts of black tea, green tea, pu-erh tea and coffee inhibited the growth and exhibited bactericidal activity against various bacteria.

U.S. Pat. No. 4,760,088 teaches that sulfide derivatives of catechins that are derived from condensed tannins possess biocidal activity. These sulfides which are prepared by reacting condensed tannin with a thiol compound under mild acidic conditions are effective biocides against wood destroying fungi and gram-positive bacteria.

The antifouling properties of phenolic acid sulphates isolated from marine organisms is discussed in "The Antifouling Activity of Natural and Synthetic Phenolic Acid Sulphate Esters," J. S. Todd et al., Phytochem 34(2) 401–404, 1993. This study found that p-(sulphooxy) cinnamic acid, isolated from the seagrass *Zostera marina*, prevents attachment of marine bacteria and barnacles to artificial surfaces.

U.S. Pat. No. 5,238,572 teaches methods for treating microbial slime in industrial water systems by adding to the water a combination of enzymes specific to the numerous saccharide units that make up the slime forming exopolysaccharide layer. The enzymes comprise galactosidase, galacturonidase, rhamnosidase, xylosidase, fucosidase, arabinosidase, and α-glucosidase.

DETAILED DESCRIPTION OF THE INVENTION

The present invention provides for methods for inhibiting the attachment of microorganisms to the surfaces of aqueous systems comprising adding to the aqueous system an effective inhibiting amount of a water soluble or dispersible tannin-containing polymer.

The present invention relates to methods for inhibiting the attachment of microorganisms to the surfaces of aqueous systems comprising adding a water soluble or dispersible tannin containing polymer composition comprising a copolymer of a tannin and a cationic monomer. In another embodiment of the invention, the water soluble or dispersible tannin containing polymer composition comprises a polymer of tannin; a cationic monomer and at least one monomer selected from the group consisting of an anionic monomer and a nonionic monomer.

Tannin, also called tannic acid, occurs naturally in the leaf, branch, bark and fruit of many plants. As disclosed by A. Pizzi in "Condensed Tannin for Adhesives", Ind. Eng. Chem. Prod. Res. Dev. 1982, 21, pages 359–369, the natural tannins can be classified as "hydrolyzable" and "condensed" tannins. The composition and structure of tannin will vary with the source and the method of extraction, but the empirical structure is given as $C_{76}H_{52}O_{46}$ with many OH groups attached to the aromatic rings. The tannin employed in the present invention is preferably a condensed tannin including but not limited to those tannins derived from Quebracho, Mimosa, and Sumac. The present inventors anticipate that hydrolyzable tannins will also be effective in the present invention.

The cationic monomer is selected from a group containing ethylenically unsaturated quaternary ammonium, phosphonium or sulfonium ions. Typical cationic monomers are quaternary ammonium salts of dialkylaminoalkyl-(meth)acrylamides, dialkylaminoalkyl(meth)acrylates and diallyl dialkyl ammonium chloride.

The preferred cationic monomers selected from the group include but are not limited to methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyldiethyl ammonium chloride. The most preferred cationic monomer is methyl chloride quaternary salt of diethylaminoethyl acrylate.

The anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. The preferred anionic monomer is acrylic acid.

The nonionic monomer is selected from the group of ethylenically unsaturated nonionic monomers which comprise but are not limited to acrylamide, methacrylamide, N-methylolacrylamide, N,N-dimethylacrylamide; lower alkyl ($C_1$–$C_6$) esters including vinyl acetate, methyl acrylate, ethyl acrylate, and methyl methacrylate; hydroxylated lower alkyl ($C_1$–$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

The preferred copolymer of tannin and cationic monomer contains 20 to 80 weight % of tannin. More preferably, the copolymer contains from 30 to 60 weight % of tannin and most preferably, from 30 to 50 weight % of the tannin in the copolymer, provided the total weight of tannin and cationic monomer totals 100 weight %. More preferably still, the copolymers have a weight % of 30% tannin and 70% cationic monomer and 50% tannin and 50% cationic monomer. These particular copolymers are most preferred when the tannin is a Mimosa type tannin and the cationic monomer is methyl chloride quaternary salt of dimethylaminoethyl acrylate.

The number average molecular weight of the resulting tannin containing polymer is not critical, as it is still water soluble or dispersible. The tannin containing polymers may be prepared by mixing the desired monomers with tannin and initiating by a free radical initiator via solution, precipitation or emulsion polymerization techniques. Conventional initiators such as azo compounds, persulfates, peroxides and redox couples may be used. The preferred initiators are 2,2'azobis(2-amidinopropane) dihydrochloride, available as V-50 from Wako Chemicals and t-butylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° and 100° C., preferably 40° to 70° C. The pH of the reaction mixture is also not critical and is generally in the range of 2.0 to 8.0. The resulting tannin containing polymers are characterized by C-13 NMR, Brookfield viscosity and percent solids.

Synthesis methods and procedures are demonstrated in copending Ser. No. 08/246,547, the contents of which are wholly incorporated herein by reference.

The polymers of the present invention will inhibit the attachment of microbes to surfaces in industrial aqueous systems. By preventing this attachment, the formation of slimes is inhibited. The methods of the present invention are utilized in aqueous systems where microbial slime causes problems. Systems which are particularly susceptible to slime proliferation are papermaking and cooling water systems where poor paper quality, machine downtime and fouled heat exchangers result from slime formation.

The methods claimed are generally applicable to the control of attachment of microorganisms. These microbes include but are not limited to Pseudomonas, Klebsiella, Aerobacter, Acinetobacter, Enterobacter, and Flavobacterium.

The total amount of tannin containing polymer used in the methods of the present invention is that amount which is sufficient to inhibit attachment of microbes. This amount will vary according to the conditions of the aqueous system and will be determined by the amount of slime already present, the amount of bacteria present in the aqueous system, the type and nature of surface to be treated, and the pH and temperature of the aqueous system.

Preferably, the total amount of polymer added to the aqueous system ranges from 62 to 1000 parts per million parts of the aqueous system. More preferably, the range is from about 62 parts to about 125 parts per million parts of the aqueous system.

The polymer is preferably applied to the aqueous phase in contact with the surface experiencing or having the potential to experience microbial fouling. The polymer may also be applied directly to the surface experiencing or having the potential to experience microbial fouling.

The polymer may be applied neat or as a solution. When a solution is employed, the preferred solvent is water; however, any solvent that is compatible with the tannin containing polymer and aqueous system to be treated may be employed. The polymers may be added in conjunction with biocides and surfactants as an adjunct for a complete program for microbial control.

The invention will now be further described with reference to a number of specific examples which are to be regarded solely as illustrative and not as restricting the scope of the invention.

EXAMPLES

The microbial culture used in the study of bacterial attachment in the following examples was prepared as follows: to a flask containing 50 mL of Simple Salts Medium (SSM) and 3 g/l of glucose was added 50 μl of a solution containing 10 μCi/mL of 3H-adenine. The SSM (pH=7) contained:

0.79 g $(NH_4)SO_4$ 0.06 g $MgSO_4$ 1.01 g KCl 3.81 g $KH_2PO_4$ 6.00 g $K_2HPO_4$ 3.00 g glucose 1.0 L deionized $H_2O$ This flask was inoculated with a field isolate identified as *Pseudomonas aeruginosa*. The microbial culture was grown overnight at 37° C. with shaking at 200 rpm. This procedure generated a radio-labeled culture which could be monitored using a scintillation counter.

Following incubation, the culture was centrifuged at 12,000 xg for 15 minutes in a Sorvall (Newtown, Conn.) RC-5 centrifuge. The supernatant was decanted and the culture was re-suspended in SSM to remove any non-incorporated radio-label. Centrifugation was repeated, the supernatant decanted, and the pellet was re-suspended in five mL of SSM. In a side-arm flask containing SSM (approximately 5 to 10 mL), a 300 Klett Unit suspension was prepared by adding an appropriate amount of the cell suspension to the flask. This suspension contained approximately $10^9$ CFU/mL, and was used in the assay described below.

The assay used to test compounds for anti-sessile activity is microplate-based and uses Dynatech Laboratories, Inc. (Chantilly, Va.) Immulon 1 Removawell Strips. Each well in these strips can be removed individually and tested for adhesion of microbes to its surface. In a typical assay, the wells are pre-wetted with 25 μl of SSM for 30 minutes. The test compound is added to six wells of the microplate at a volume per well of 50 μl. This is followed by addition of 50 μl of the radio-labeled cell suspension discussed above. The order of addition can be reversed in order to test whether the compound can remove cells from the surface. Immediately after the final component of the test has been added to the wells, three of the wells are harvested to establish the initial amount of attachment to the polystyrene surface (T=0 hr). Harvesting removes any unattached cells and is accomplished by rinsing the wells with de-ionized water using a Skatron Titertek Cell Harvester (Sterling, Va.). The wells are then placed in scintillation vials, covered, and placed in a boiling water bath for 30 minutes in order to lyse the cells and make the radio-label available for counting. After the vials have cooled, five mL of liquid scintillation fluid is added to the vials and the amount of radio-label is counted in a liquid scintillation counter. The remaining wells are placed on a Fisher Vortex Genie 2 (Pittsburgh, Pa.) (modified to hold a microplate) at a very slow shaking speed. At T=1 hr, the remaining wells are harvested as outlined above. The amount of radio-label is compared with those of wells that were not exposed to any test compound (these are the controls).

In the following example, various copolymers of tannin and cationic monomer were tested for their ability to inhibit the attachment of microbes to surfaces. Incubation time for the assay was one hour. The results of this testing are presented in Table I.

TABLE I

Attachment of *Pseudomonas aeruginosa* to plastic microtiter wells
-chemicals added first

| Inhibitor (ppm) | CPM | | | Avg. CPM | St.Dev. | % Attached |
|---|---|---|---|---|---|---|
| Control | 6361 | 6416 | 6366 | | | |
| Control | 6385 | 6708 | 6296 | 6422 | 145 | |
| A ( 62) | 6554 | 6781 | 6592 | 6642 | 121 | 103 |
| A (125) | 6023 | 5686 | 5342 | 5684 | 340 | 88 |
| A (250) | 3831 | 3501 | 4003 | 3778 | 255 | 59 |
| A (500) | 4780 | 4338 | 3620 | 4246 | 586 | 66 |
| B ( 62) | 7095 | 6771 | 6860 | 6909 | 168 | 108 |
| B (125) | 6326 | 6476 | 5997 | 6266 | 245 | 98 |
| B (250) | 5869 | 5709 | 5966 | 5848 | 130 | 91 |
| B (500) | 6012 | 5445 | 5258 | 5572 | 393 | 87 |
| C ( 62) | 6268 | 6676 | 6148 | 6364 | 277 | 99 |
| C (125) | 6102 | 6937 | 7041 | 6693 | 515 | 104 |
| C (250) | 6328 | 6079 | 5971 | 6126 | 183 | 95 |
| C (500) | 4905 | 5866 | 5532 | 5434 | 488 | 85 |

A is 50% tannin and 50% methyl chloride quaternary salt of diethylaminoethyl acrylate (AETAC), by weight
B is 30% tannin and 70% AETAC, by weight
C is 40% tannin and 60% AETAC, by weight The following example shows the effect of the inhibitor compounds on the attachment of the test organism when the radio-labeled bacteria are added prior to the addition of the test compounds. The time of the assay was one hour. Test results are shown in Table II

TABLE II

Attachment of *Pseudomonas aeruginosa* to plastic microtiter wells
-microbes added first

| Inhibitor (ppm) | CPM | | | Avg. CPM | St.Dev. | % Attached |
|---|---|---|---|---|---|---|
| Control | 8030 | 7832 | 7318 | | | |
| Control | 8002 | 7633 | 7811 | 7771 | 265 | |
| A ( 62) | 8004 | 7214 | 7553 | 7590 | 397 | 98 |

TABLE II-continued

Attachment of *Pseudomonas aeruginosa* to plastic microtiter wells -microbes added first

| Inhibitor (ppm) | CPM | | | Avg. CPM | St.Dev. | % Attached |
|---|---|---|---|---|---|---|
| A (125) | 6808 | 6511 | 6942 | 6754 | 221 | 87 |
| A (250) | 5844 | 6202 | 6215 | 6087 | 211 | 78 |
| A (500) | 5645 | 6186 | 5774 | 5868 | 283 | 76 |
| B ( 62) | 8028 | 8167 | 7439 | 7878 | 387 | 101 |
| B (125) | 8120 | 7842 | 8302 | 8088 | 232 | 104 |
| B (250) | 7526 | 7970 | 7834 | 7777 | 228 | 100 |
| B (500) | 7149 | 7344 | 7076 | 7190 | 138 | 93 |
| C ( 62) | 7845 | 7527 | 7295 | 7556 | 276 | 97 |
| C (125) | 7309 | 7004 | 7859 | 7391 | 433 | 95 |
| C (250) | 6891 | 7061 | 7284 | 7079 | 197 | 91 |
| C (500) | 6268 | 6195 | 6970 | 6478 | 428 | 83 |

A is 50% tannin and 50% AETAC, by weight
B is 30% tannin and 70% AETAC, by weight
C is 40% tannin and 60% AETAC, by weight As demonstrated in Tables I and II the inventive copolymers were effective at inhibiting attachment when either the chemicals or the microbes are added first.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for inhibiting the attachment of microbes to the surfaces of aqueous systems comprising adding to said aqueous systems an effective inhibiting amount of a copolymer of a tannin and a cationic monomer, said cationic monomer being selected from the group consisting of methyl chloride or dimethyl sulfate quaternary salt of dimethylaminoethyl methacrylate, diethylaminoethyl methacrylate, dimethyl aminopropyl methacrylamide, dimethylaminopropyl acrylamide, and diallyl dimethyl ammonium chloride.

2. The method as claimed in claim 1 wherein said cationic monomer is methyl chloride quaternary salt of dimethylaminoethyl acrylate.

3. The method as claimed in claim 1 wherein said tannin is a condensed tannin.

4. The method as claimed in claim 1 wherein said copolymer contains 20 to 80 weight percent of tannin.

5. The method as claimed in claim 1 wherein said copolymer contains 30 to 50 weight percent of tannin.

6. The method as claimed in claim 1 wherein said tannin is Mimosa tannin and said cationic monomer is methyl chloride quaternary salt of dimethylaminoethyl acrylate.

7. The method as claimed in claim 1 wherein said copolymer further comprises a monomer selected from the group consisting of an anionic monomer and a nonionic monomer.

8. The method as claimed in claim 7 wherein said anionic monomer is acrylic acid.

9. The method as claimed in claim 7 wherein said nonionic monomer is selected from the group consisting of acrylamide and allyl glycidyl ether.

10. The method as claimed in claim 1 wherein said microbes are bacteria.

11. The method as claimed in claim 10 wherein said bacteria is *Pseudomonas aeruginosa*.

12. The method as claimed in claim 10 wherein said bacteria is *Klebsiella pneumoniae*.

13. The method as claimed in claim 1 wherein said copolymer is added to said aqueous system in an amount ranging from about 62 parts to about 1000 parts per million parts of the aqueous system.

14. The method as claimed in claim 1 wherein said copolymer is added to said aqueous system in an amount ranging from about 62 parts to about 125 parts per million parts of the aqueous system.

15. The method as claimed in claim 1 wherein said aqueous system is a papermaking system.

16. The method as claimed in claim 1 wherein said aqueous system is a cooling water system.

* * * * *